(12) United States Patent
Li et al.

(10) Patent No.: US 9,189,633 B2
(45) Date of Patent: Nov. 17, 2015

(54) DOWNLOAD MANAGEMENT METHOD AND DEVICE BASED ON ANDROID BROWSER

(71) Applicant: SHENZHEN COOCAA NETWORK TECHNOLOGY CO., LTD., Shenzhen, Guangdong (CN)

(72) Inventors: Xiaorong Li, Shenzhen (CN); Wenyang Lv, Shenzhen (CN)

(73) Assignee: SHENZHEN COOCAA NETWORK TECHNOLOGY CO., LTD., Shenzhen (CN)

( * ) Notice: Subject to any disclaimer, the term of this patent is extended or adjusted under 35 U.S.C. 154(b) by 195 days.

(21) Appl. No.: 13/977,031

(22) PCT Filed: Jan. 21, 2013

(86) PCT No.: PCT/CN2013/070796
§ 371 (c)(1),
(2) Date: Jun. 28, 2013

(87) PCT Pub. No.: WO2014/107920
PCT Pub. Date: Jul. 17, 2014

(65) Prior Publication Data
US 2014/0208438 A1   Jul. 24, 2014

(30) Foreign Application Priority Data
Jan. 18, 2013  (CN) .......................... 2013 1 0019556

(51) Int. Cl.
| | | |
|---|---|---|
| G06F 7/04 | (2006.01) | |
| G06F 17/30 | (2006.01) | |
| H04N 7/16 | (2011.01) | |
| G06F 21/60 | (2013.01) | |
| H04L 29/06 | (2006.01) | |
| H04L 29/12 | (2006.01) | |
| H04N 21/443 | (2011.01) | |
| H04N 21/61 | (2011.01) | |
| H04N 21/81 | (2011.01) | |

(52) U.S. Cl.
CPC ............ *G06F 21/60* (2013.01); *H04L 61/6022* (2013.01); *H04L 63/0876* (2013.01); *H04L 63/101* (2013.01); *H04N 21/4433* (2013.01); *H04N 21/6125* (2013.01); *H04N 21/6175* (2013.01); *H04N 21/8166* (2013.01)

(58) Field of Classification Search
CPC ... G06F 21/60; H04L 63/101; H04L 61/6022; H04L 63/0876; H04N 21/8166; H04N 21/4433; H04N 21/6125; H04N 21/6175
USPC .......................................................... 726/27
See application file for complete search history.

(56) References Cited

U.S. PATENT DOCUMENTS

| | | | | |
|---|---|---|---|---|
| 6,587,873 | B1 * | 7/2003 | Nobakht et al. | ............... 709/219 |
| 2006/0251086 | A1 * | 11/2006 | Ha et al. | ........................ 370/401 |
| 2012/0124678 | A1 * | 5/2012 | Shintani et al. | .................. 726/29 |

*Primary Examiner* — Kambiz Zand
*Assistant Examiner* — Benjamin Kaplan (57) ABSTRACT

The present disclosure provides a download management method and device based on Android browser. The download management method includes the following steps: obtaining a physical address of a network card of a television when a download request input from a user through the browser is received; and judging whether the television corresponding to the physical address is granted a download permission corresponding to the download request; if the physical address is granted the download permission, implementing the download according to the download request; otherwise, if the physical address is not granted the download permission, preventing the download. The method and device of the present disclosure can effectively control the download contents of the television and thus prevent random downloads from reducing the safety and stability of the system and further thus improves the user experience.

16 Claims, 6 Drawing Sheets

DOWNLOAD MANAGEMENT METHOD AND DEVICE BASED ON ANDROID BROWSER

BACKGROUND

1. Technical Field

The present disclosure relates to fields of display terminals, and particularly, to a download management method and device based on an Android browser.

2. Description of Related Art

In recent years, with the popularization of Android systems in consumer electronic products, smart cloud televisions equipped with Android systems become a focus of the color television industry. Like Android mobile phones, being equipped with Android operating systems, Android smart televisions allow users to run browsers to surf the Internet freely like on personal computers. However, since the Android system is an open platform, more and more developers are engaged in to develop a number of articles of application software. Most of the articles of application software are based on touch operations of mobile phones and panel computers, making it disadvantageous to run the articles of application software in televisions. What's worse, some articles of the application software may affect the running speed of the system of the television. Thus, in a situation where no controlling method is applied to the download resource, a user may download corresponding resources at will, which may cause some download resources to affect the safety and stability of the system of the television for not being suitable to the television.

SUMMARY

The present disclosure provides a download management method based on an Android browser, which can effectively control download contents of a television, improve the safety and stability of the system of the television, and thus improve the user experience.

The download management method based on an Android browser includes:

obtaining a physical address of a network card of a television when a download request input from a user through the browser is received; and judging whether the television corresponding to the physical address is granted a download permission corresponding to the download request; if the physical address is granted the download permission, implementing the download according to the download request; otherwise, if the physical address is not granted the download permission, preventing the download.

Preferably, basic information of the television is obtained at simultaneously when the physical address of the network card of the television is obtained; the method further includes the following step after the step of preventing the download:

analyzing download contents corresponding to the download request, searching and providing resource information which is related to the download contents and matches with the television according to the download contents and the basic information of the television.

Preferably, the step of obtaining a physical address of a network card of a television when a download request input from a user through the browser is received includes:

sending the download request to a C language plug-in interface when the download request inputted from a user through the browser is received, and sending the download request to the Android browser through a Java communication interface; and obtaining the physical address of the network card of the television and the basic information of the television when the Android browser receives the download request.

Preferably, wherein the step of judging whether the television corresponding to the physical address is granted the download permission corresponding to the download request includes:

sending the obtained physical address to the server terminal;

analyzing a determining result sent from the server terminal that determines whether the physical address is granted the download permission corresponding to the download request to obtain an analyzing result; and judging whether the physical address is granted the download permission corresponding to the download request according to the analyzing result.

Preferably, the method further includes the following step after the step of sending the obtained physical address to the server terminal: judging whether the basic information and the physical address are registered in the server terminal;

if the basic information and the physical address are registered in the server terminal, implementing the step of analyzing a determining result sent from the server terminal that determines whether the physical address is granted the download permission corresponding to the download request to obtain an analyzing result;

if the basic information and the physical address are not registered in the server terminal, registering the basic information and the physical address in the server terminal, controlling the server terminal to grant the download permission to the physical address, and implementing the step of analyzing a determining result sent from the server terminal that determines whether the physical address is granted the download permission corresponding to the download request to obtain an analyzing result.

The present disclosure further provides a download management device based on an Android browser, including: a non-transitory storage medium, at least one processor, and modules that are stored in the non-transitory storage medium and are executed by the at least one processor, the modules include:

an obtaining module configured to obtain a physical address of a network card of a television when receiving a download request inputted from a user through the browser;

a first judging module configured to judge whether the television corresponding to the physical address is granted the download permission corresponding to the download request;

a download module configured to perform the download according to the download request if the physical address is granted the download permission; and a preventing module configured to prevent the download if the physical address is not granted the download permission.

Preferably, the obtaining module further obtains basic information of the television at the same time when obtaining the physical address, and the device further includes an analyzing module configured to analyze download contents corresponding to the download request, and to search and provide resource information which is related to the download contents and matches with the television according to the download contents and the basic information.

Preferably, the device of claim 13, wherein the obtaining module includes:

an outputting unit configured to send the download request to a C language plug-in interface when receiving the download request inputted from a user through the browser, and to send the download request to the Android browser through a Java communication interface; and an obtaining units configured to obtain the physical address and the basic information when the Android browser receives the download request.

Preferably, the first judging module includes:

a sending unit configured to send the obtained physical address to the server terminal;

an analyzing unit configured to analyze a determining result sent from the server terminal that determines whether the physical address is granted the download permission corresponding to the download request to obtain an analyzing result; and a judging unit configured to judge whether the physical address is granted the download permission corresponding to the download request according to the analyzing result.

Preferably, the device further includes a second judging module and a registering module;

the second judging module is configured to judge whether the basic information and the physical address are registered in the server terminal;

if the basic information and the physical address are registered in the server terminal, the analyzing unit analyzes the determining result sent from the server terminal that determines whether the physical address is granted the download permission corresponding to the download request to obtain an analyzing result;

if the basic information and the physical address are not registered in the server terminal, the registering module registers the basic information and the physical address in the server terminal, and controls the server terminal to grant the download permission to the physical address, and thereafter the analyzing unit analyzes the determining result sent from the server terminal that determines whether the physical address is granted the download permission corresponding to the download request to obtain an analyzing result.

In the present disclosure, after the download request inputted from a user through the browser is received, the physical address of the network card of the television is obtained to judge whether the television is granted the download permission corresponding to the download request according to the physical address. If the television is granted the download permission, normal download is performed. If the television is not granted the download permission, the download is prevented. Therefore, the download contents of the television can be effectively controlled, which prevents random downloads from affecting the safety and stability of the system and thus improves the user experience of the television.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
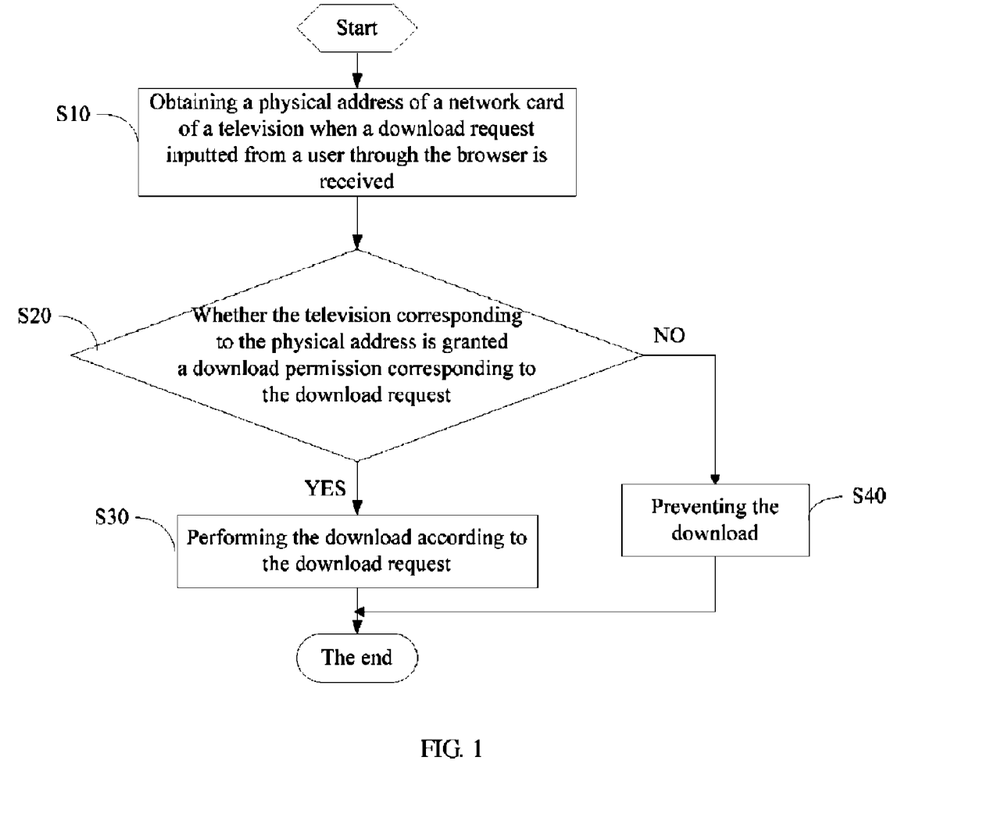
FIG. 1 is a flowchart of a download management method based on an Android browser in accordance with an embodiment of the present disclosure.

Referring to FIG. 1, which is a flowchart of a download management method based on an Android browser in accordance with an embodiment of the present disclosure, the download management method based on an Android browser includes the following steps.

Step S10, obtaining a physical address of a network card of a television when a download request inputted from a user through the browser is received.

According to an embodiment of the present disclosure, the Android browser is configured with a service plug-in for obtaining and receiving commands from the browser. After receiving the download request sent from the browser, the service plug-in obtains the physical address of the network card of the television, that is, MAC address of the television. It is noted that the MAC address is the exclusive identification of the television. In production of the television, the producer can number the MAC address of each television to form the exclusive identification of the television.

Step S20, judging whether the television corresponding to the physical address is granted a download permission corresponding to the download request. Step S30 is implemented if the television is granted the download permission. Otherwise, step S40 is implemented if the television is not granted the download permission.

Step S30, performing the download according to the download request.

Step S40, preventing the download.

In the embodiment, the download permission of each television can be configured in a server terminal. After obtaining the physical address of the network card of the television, the service plug-in sends the physical address to the server terminal. The server terminal searches download permission information of the television corresponding to the physical address according to the physical address. The server terminal then feeds the download permission information back to the service plug-in. The service plug-in judges whether the television is granted the download permission corresponding to the download request according to the download permission information from the server terminal. If the television is granted the download permission, normal download is allowed and thus corresponding applications can be downloaded. If the television is not granted the download permission, the download is prevented.

In the present disclosure, after the download request inputted from a user through the browser is received, the physical address of the network card of the television is obtained to judge whether the television is granted the download permission corresponding to the download request according to the physical address. If the television is granted the download permission, normal download is performed. If the television is not granted the download permission, the download is prevented. Therefore, the download contents of the television can be effectively controlled, which prevents random downloads from affecting the safety and stability of the system and thus improves user experience of the television.

Figure 2:
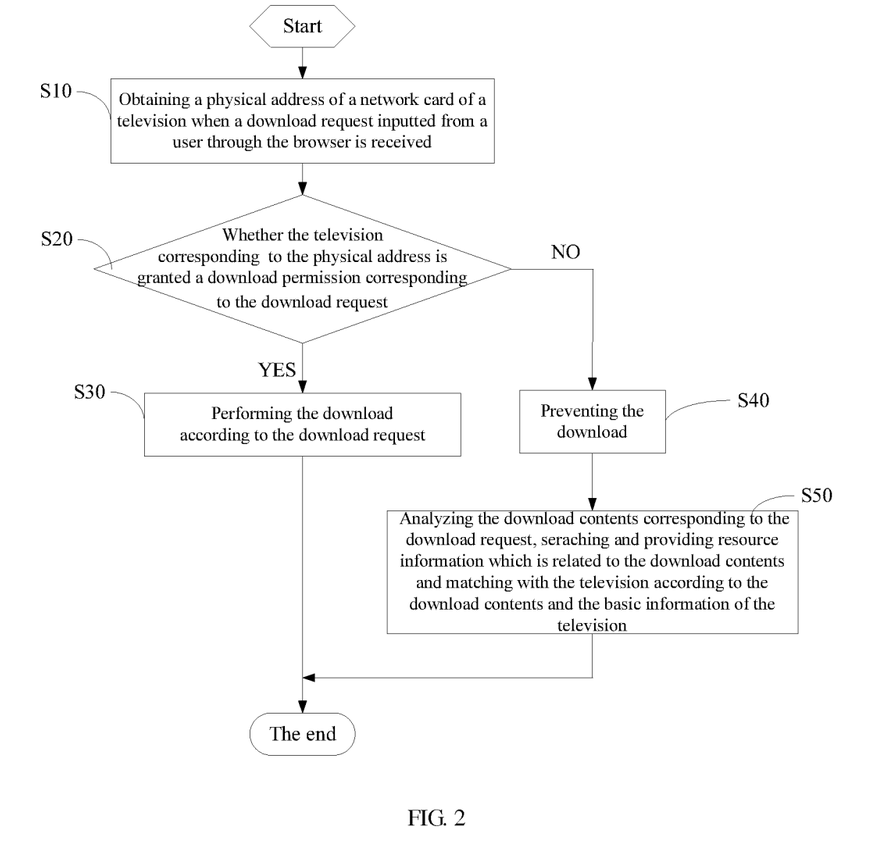
FIG. 2 is a flowchart of a download management method based on an Android browser in accordance with another embodiment of the present disclosure.

Furthermore, referring to FIG. 2, which is a flowchart of a download management method based on an Android browser in accordance with another embodiment of the present disclosure. Based on the above embodiment, in the present embodiment, basic information of the television as well as the physical address of the network card of the television is obtained in step S10.

The method of the present embodiment further includes the following steps after step S40.

Step S50, analyzing the download contents corresponding to the download request, searching and providing resource information which is related to the download contents and matches with the television according to the download contents and the basic information of the television.

The basic information of the television of the present embodiment includes, for example, model information of the television. If the television is not granted the download permission corresponding to the download request, the resource information which is related to the download contents corresponding to the download request is searched in a resource background of the television platform. The resource information matches with the television and is provided to the service plug-in. The browser obtains the resource information from the service plug-in and displays the resource information for being operated by the user.

Figure 3:
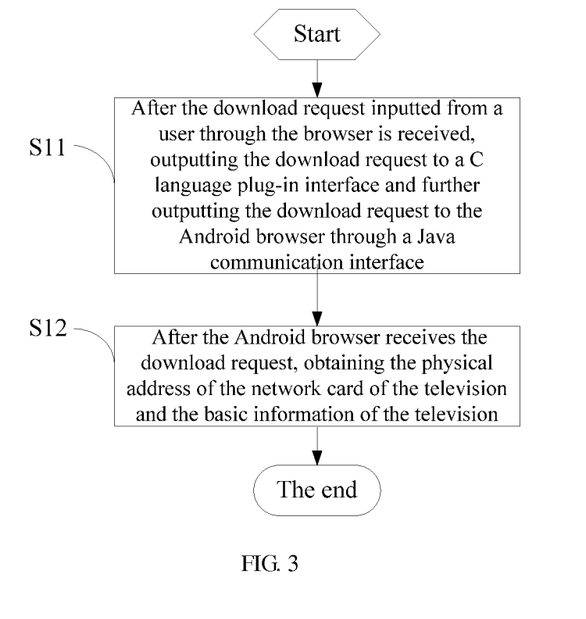
FIG. 3 a flowchart of a step of obtaining address information of a network card of a television and basic information of the television of the method of FIG. 2.

Referring to FIG. 3, which is a flowchart of a step of obtaining address information of a network card of a television and basic information of the television of the method of FIG. 2, based on the above embodiment, step S10 of the method of the embodiment includes the following steps.

Step S11, after the download request inputted from a user through the browser is received, outputting the download request to a C language plug-in interface and further outputting the download request to the Android browser through a Java communication interface.

Step S12, after the Android browser receives the download request, obtaining the physical address of the network card of the television and the basic information of the television.

In the embodiment, web pages based on the Android browser include different kinds of resources (such as applications, videos, music, etc.) available for download. When a user clicks the corresponding resource to download it, the C language in the C language plug-in can be used for calling the corresponding function method in the Java communication interface. During the calling process, a corresponding Java package in the cache is at first loaded. A constructed function, parameters and a method name are called in turn thereafter, and corresponding information are at last returned through object-calling. A getstate function in the Java type interface is called to obtain the information returned from the Android browser to the Java type interface. According to the information returned to the Java type interface, the connection state between the Java communication interface and the service plug-in of the Android browser can be determined. After the Java communication interface and the service plug-in of the Android browser are connected successfully, the information of the download request is sent to the service plug-in of the Android browser. After that, the basic information of the television and the physical address of the network card of the television are obtained through the service plug-in. Specifically, the basic information of the television can be obtained by calling documents of the information base of the system. If the network of the television is cable television network, the physical address of the network card can be obtained by reading the file named sys/class/net/eth0/address. If the network of the television is wireless network, the physical address of the network card can be obtained by calling the method named getConnection Info of WifiManager.

Figure 4:
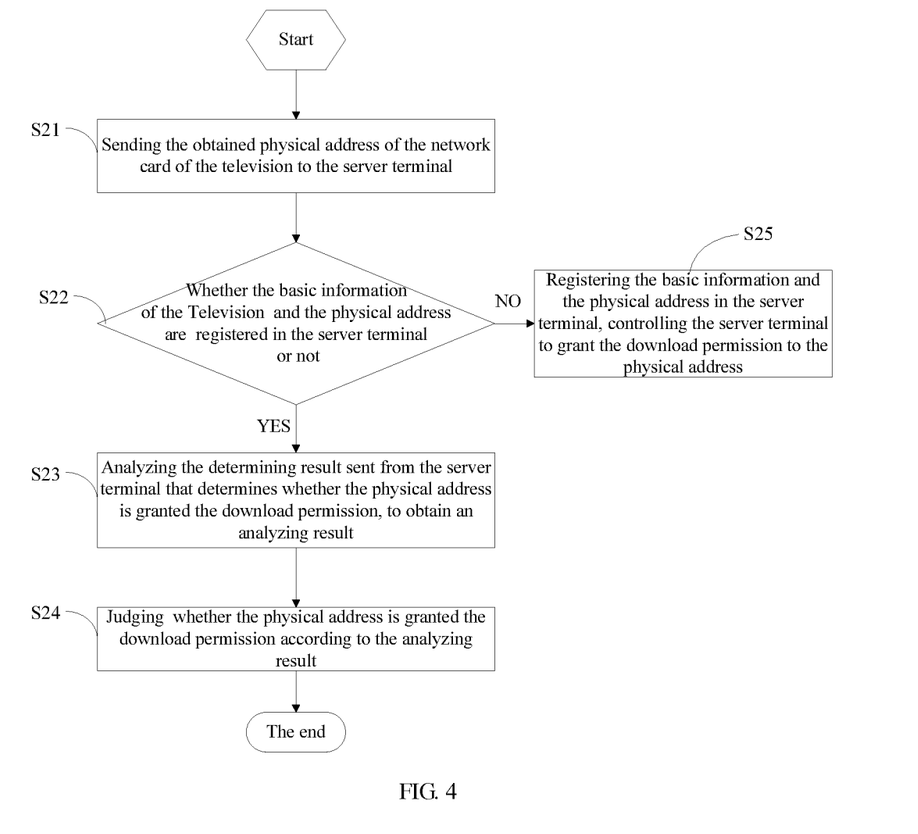
FIG. 4 is a flowchart of a step of judging whether the television corresponding to a physical address is granted the download permission of the method in accordance with an embodiment of the present disclosure.

Referring to FIG. 4, which is a flowchart of a step of judging whether the television corresponding to a physical address is granted the download permission of the method in accordance with an embodiment of the present disclosure, in the embodiment, step S20 includes the following steps.

Step S21, sending the obtained physical address of the network card of the television to the server terminal.

Step S22, analyzing the determining result sent from the server terminal that determines whether the physical address is granted the download permission, to obtain an analyzing result.

Step S23, judging whether the physical address is granted the download permission according to the analyzing result.

In the embodiment, the server terminal is configured to grant the download permission to some of the televisions. The obtained MAC address is searched and verified with a single address or MAC address field controlled by the background, and the verified result is sent to the service plug-in. The service plug-in judges whether the television is granted the download permission corresponding to the download request according to the received verified result.

Furthermore, step S20 further includes step S24 after step S21: judging whether the basic information of the television and the physical address are registered in the server terminal or not. Step S22 is implemented if the basic information and the physical address are registered in the server terminal; otherwise, step S25 is implemented if the basic information and the physical address are not registered in the server terminal Step S25, registering the basic information and the physical address in the server terminal, controlling the server terminal to grant the download permission to the physical address, and thereafter implementing step S22.

For example, when the service plug-in is called for the first time, the service plug-in sends the basic information of the television to the server terminal as well. The server terminal records the basic information and the physical address of the network card of the television as newly registered information. Meanwhile, the server terminal grants the physical address the download permission. In the embodiment, since the basic information and the physical address are registered in the server terminal, in the following process of using the television, by sending the physical address, the information of the television can be obtained by looking up the physical address. This reduces the data transmission amount between the television and the server terminal, and thus improves the running speed of the television system.

The present disclosure further provides a download management device based on an Android browser for the implementation of the above method. The download management device includes a download management system, a non-transitory storage medium, and at least one processor.

The download management system includes a number of function modules. The function modules may include computerized code in the form of one or more programs that are stored in the non-transitory storage medium. The computerized code includes instruction that are executed by the at least one processor.

Figure 5:
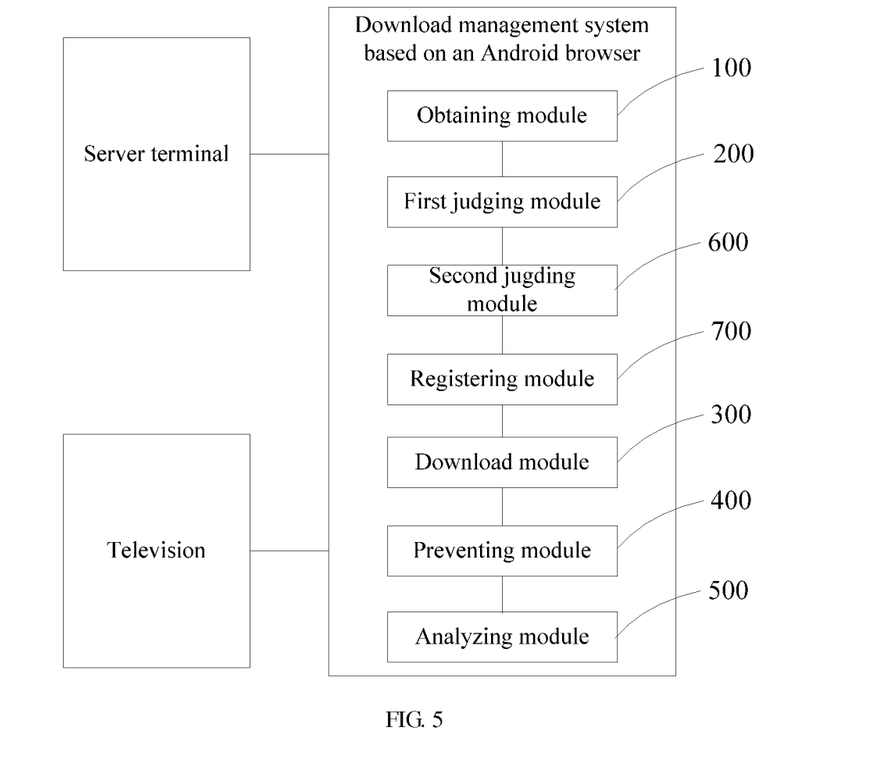
FIG. 5 is a block diagram of a download management system based on an Android browser in accordance with an embodiment of the present disclosure.

Referring to FIG. 4, which is a block diagram of the download management system based on an Android browser of an embodiment. In the embodiment, the download management system includes an obtaining module 100, a first judging module 200, a download module 300, and a preventing module 400.

The obtaining module 100 is configured to obtain a physical address of a network card of a television when a download request inputted from a user through the browser is received.

In the embodiment, the Android browser can be configured with a service plug-in for obtaining and receiving commands from the browser. When the obtaining module 100 in the service plug-in receives the download request from the browser, the obtaining module 100 obtains the physical address of the network card of the television, that is, the MAC address of the television. It is noted that the MAC address is the exclusive identification of the television. In the production of the television, the producer numbers each television to form the exclusive identification of the television.

The first judging module 200 is configured to judge whether the television corresponding to the physical address is granted the download permission corresponding to the download request.

If the television is granted the download permission, the download module 300 performs the related download according to the download request.

Otherwise, the preventing module 400 prevents the download.

In the embodiment, the server terminal can configure the download permission of each television. After the obtaining module 100 of the service plug-in obtains the physical address of the network card of the television, the obtaining module 100 sends the physical address to the server terminal. The server terminal looks up the download permission information of the corresponding television according to the physical address, and sends the download permission information to the service plug-in. The first judging module 200 of the service plug-in judges whether the television is granted the download permission according to the download permission information sent from the server terminal. If the television is granted the download permission, the download module 300 performs normal download of the corresponding applications. If the television is not granted the download permission, the preventing module 400 prevents the download of the contents of the download request.

The obtaining module 100 obtains the physical address of the network card of the television when receiving the download request which is inputted from a user through the browser, and judges whether the television is granted the download permission corresponding to the download request according to the physical address. If the television is granted the download permission, the download module 300 performs normal download. If the television is not granted the download permission, the preventing module 400 prevents the download of the contents corresponding to the download request. Thus, the download management system can effectively control the download contents of the television to prevent random downloads from reducing the safety and stability of the television, thereby improving the user experience of the television.

The download management system further includes an analyzing module 500 for analyzing the download contents corresponding to the download request. The analyzing module 500 is further configured to search and provide resource information which is related to the download contents and matches with the television, according to the download contents and the basic information of the television.

The basic information of the television of the embodiment includes, for example, model information of the television. If the television is not granted the download permission corresponding to the download request, the analyzing module 500 searches the resource information which is related to the download contents in the resource background of the television platform and matches with the television, and provides the resource information to the service plug-in. The browser obtains the resource information from the service plug-in and display the resource information to allow a user to choose the corresponding operation.

Figure 6:
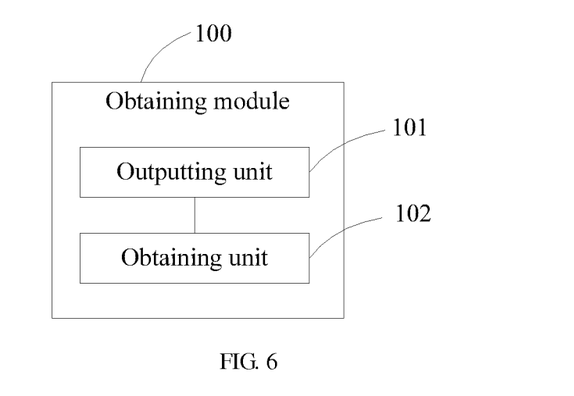
FIG. 6 is a block diagram of an obtaining module of the download management system of FIG. 5.

Referring to FIG. 6, which is a block diagram of an obtaining module of the download management system of FIG. 5, the obtaining module 100 includes an outputting unit 101 and an obtaining unit 102.

The outputting unit 101 is configured to output the download request to a C language plug-in interface when the browser receives the download request, and to send the download request to the Android browser through a Java communication interface.

The obtaining unit 102 is configured to obtain the physical address and the basic information when the Android browser receives the download request.

In the embodiment, the web pages based on the Android browser includes different kinds of resources (such as applications, videos, music, etc.) available for download. After a user clicks the corresponding resource to download it, C language in the C language plug-in can call the corresponding function method in the Java communication interface. During the calling process, a corresponding Java package in the cache is at first loaded. A constructed function, parameters and a method name are called in turn thereafter, and corresponding information are at last returned through object-calling. A getstate function in the Java type interface is called to obtain the information returned from the Android browser to the Java type interface. According to the information returned to the Java type interface, the connection state between the Java communication interface and the service plug-in of the Android browser can be determined. After the Java communication interface and the service plug-in of the Android browser are connected successfully, the outputting unit 101 sends the information of the download request to the obtaining unit 102 in the service plug-in of the Android browser. The obtaining unit 102 at this time obtains the basic information and the physical address of the television. Specifically, the basic information of the television can be obtained by calling the documents of the information base of the system. If the network of the television is cable television network, the physical address of the network card can be obtained by reading the file named sys/class/net/eth0/address. If the network of the television is wireless network, the physical address of the network card can be obtained by calling the method named getConnection Info of WifiManager.

Figure 7:
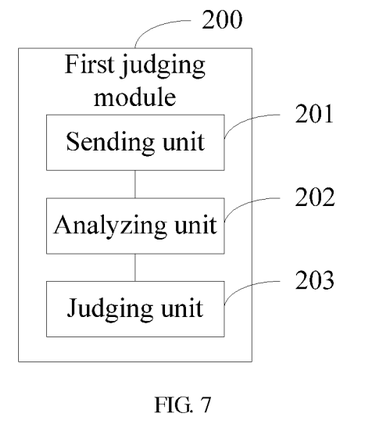
FIG. 7 is a block diagram of a first judging module of the download management system of FIG. 5.

Referring to FIG. 7, which is a block diagram of a first judging module of the download management system of FIG. 5, in the embodiment, the first judging module 200 includes a sending unit 201, an analyzing unit 202, and a judging unit 203. The sending unit 201 is configured to send the obtained physical address of the network card of the television to the server terminal.

The analyzing unit 202 is configured to analyze the determining result sent from the sever terminal that determines whether the physical address is granted the download permission corresponding to the download request, to obtain an analyzing result.

The judging unit 203 is configured to judge whether the physical address is granted the download permission corresponding to the download request according to the analyzing result.

In the embodiment, the server terminal is configured to grant the download permission to some of the televisions, search and verify the obtained MAC address with the single address or MAC address field controlled by the background, and send the verified information to the service plug-in. The service plug-in judges whether the current television is granted the download permission corresponding to the download request according to the verified information sent from the server terminal.

The obtaining module 100 sends the physical address to the sending unit 201 after receiving the physical address. The physical address is sent to the server terminal through the sending unit 201 so that the server terminal can determine whether the television corresponding to the physical address is granted the download permission or not. The server terminal sends the determining result to the analyzing unit 202 for analysis. After the analysis, the analyzing result is sent to the judging unit 203 to allow the judging unit 203 to judge whether the current television is granted the download permission.

Furthermore, the download management system based on the Android browser further includes a second judging module 600 and a registering module 700.

The second judging module 600 is configured to judge whether the basic information of the television and the physical address of the network card are registered in the server terminal.

If the basic information and the physical address are registered, the analyzing unit 202 analyzes the determining result sent from the server terminal that determines whether the physical address is granted the download permission corresponding to the download request.

If the basic information and the physical address are not registered, the registering module 700 registers the basic information and the physical address in the server terminal, controls the server terminal to grant the download permission to the physical address. After that, the analyzing unit 202 analyzes the determining result sent from the server terminal that determines whether the physical address is granted the download permission corresponding to the download request.

For example, when the service plug-in is called for the first time, the service plug-in sends the basic information of the television as well to the server terminal. The server terminal records the basic information and the physical address as newly registered information. Meanwhile, the server terminal grants the download permission to the physical address. In the embodiment, since the basic information and the physical address are registered in the server terminal by using the registering module 700, in the following process of using the television, by sending the physical address of the network card of the television, the information of the television can be obtained by looking up the physical address. This reduces the data transmission amount between the television and the server terminal, and thus improves the running speed of the television system.

By effectively controlling the download contents, the download management device of the present invention can prevent random downloads from reducing the safety and stability of using the system as well as provide corresponding television resource information to the user, thereby improving the user experience.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A download management method based on an Android browser, comprising:
    obtaining a physical address of a network card of a television when a download request input from a user through the browser is received; and
    judging whether the television corresponding to the physical address is granted a download permission corresponding to the download request; if the physical address is granted the download permission, implementing the download according to the download request; otherwise, if the physical address is not granted the download permission, preventing the download; and
    basic information of the television is obtained at simultaneously when the physical address of the network card of the television is obtained; the method further comprises the following step after the step of preventing the download:
    analyzing download contents corresponding to the download request, searching resource information in a resource background of corresponding television platform, the resource information being related to the download contents and matched with the television according to the download contents and the basic information of the television, and displaying the resource information for being operated by the user.

2. The method as claim 1, wherein the step of judging whether the television corresponding to the physical address is granted a download permission corresponding to the download request comprises:
    sending the obtained physical address to the server terminal;
    analyzing a determining result sent from the server terminal that determines whether the physical address is granted the download permission corresponding to the download request to obtain an analyzing result; and
    judging whether the physical address is granted the download permission corresponding to the download request according to the analyzing result.

3. The method as claimed in claim 2 further comprising the following step after the step of sending the obtained physical address to the server terminal: judging whether basic information of the television and the physical address are registered in the server terminal;
    if the basic information and the physical address are registered in the server terminal, implementing the step of analyzing a determining result sent from the server terminal that determines whether the physical address is granted the download permission corresponding to the download request to obtain an analyzing result;

otherwise, if the basic information and the physical address are not registered in the server terminal, registering the basic information and the physical address in the server terminal, controlling the server terminal to grant the download permission to the physical address, and implementing the step of analyzing a determining result sent from the server terminal that determines whether the physical address is granted the download permission corresponding to the download request to obtain an analyzing result.

4. The method of claim 1, wherein the step of judging whether the television corresponding to the physical address is granted the download permission corresponding to the download request comprises:

sending the obtained physical address to the server terminal;

analyzing a determining result sent from the server terminal that determines whether the physical address is granted the download permission corresponding to the download request to obtain an analyzing result; and judging whether the physical address is granted the download permission corresponding to the download request according to the analyzing result.

5. The method of claim 4 further comprising the following step after the step of sending the obtained physical address to the server terminal: judging whether the basic information and the physical address are registered in the server terminal;

if the basic information and the physical address are registered in the server terminal, implementing the step of analyzing a determining result sent from the server terminal that determines whether the physical address is granted the download permission corresponding to the download request to obtain an analyzing result;

if the basic information and the physical address are not registered in the server terminal, registering the basic information and the physical address in the server terminal, controlling the server terminal to grant the download permission to the physical address, and implementing the step of analyzing a determining result sent from the server terminal that determines whether the physical address is granted the download permission corresponding to the download request to obtain an analyzing result.

6. The method of claim 1, wherein the step of obtaining a physical address of a network card of a television when a download request input from a user through the browser is received comprises:

sending the download request to a C language plug-in interface when the download request inputted from a user through the browser is received, and sending the download request to the Android browser through a Java communication interface; and obtaining the physical address of the network card of the television and the basic information of the television when the Android browser receives the download request.

7. The method of claim 6, wherein the step of judging whether the television corresponding to the physical address is granted the download permission corresponding to the download request comprises:

sending the obtained physical address to the server terminal;

analyzing a determining result sent from the server terminal that determines whether the physical address is granted the download permission corresponding to the download request to obtain an analyzing result; and judging whether the physical address is granted the download permission corresponding to the download request according to the analyzing result.

8. The method of claim 7 further comprising the following step after the step of sending the obtained physical address to the server terminal: judging whether the basic information and the physical address are registered in the server terminal;

if the basic information and the physical address are registered in the server terminal, implementing the step of analyzing a determining result sent from the server terminal that determines whether the physical address is granted the download permission corresponding to the download request to obtain an analyzing result;

if the basic information and the physical address are not registered in the server terminal, registering the basic information and the physical address in the server terminal, controlling the server terminal to grant the download permission to the physical address, and implementing the step of analyzing a determining result sent from the server terminal that determines whether the physical address is granted the download permission corresponding to the download request to obtain an analyzing result.

9. A download management device based on an Android browser, comprising: a non-transitory storage medium, at least one processor, and modules that are stored in the non-transitory storage medium and are executed by the at least one processor, the modules comprise:

an obtaining module configured to obtain a physical address of a network card of a television when receiving a download request inputted from a user through the browser;

a first judging module configured to judge whether the television corresponding to the physical address is granted the download permission corresponding to the download request;

a download module configured to perform the download according to the download request if the physical address is granted the download permission; and a preventing module configured to prevent the download if the physical address is not granted the download permission;

wherein the obtaining module further obtains basic information of the television at the same time when obtaining the physical address, and the device further comprises an analyzing module configured to analyze download contents corresponding to the download request, and to search resource information in a resource background of corresponding television platform, the resource information being related to the download contents and matched with the television according to the download contents and the basic information of the television, and to display the resource information for being operated by the user.

10. The device of claim 9, wherein the first judging module comprises:

a sending unit configured to send the obtained physical address to a server terminal;

an analyzing unit configured to analyze a determining result sent from the server terminal that determines whether the physical address is granted the download permission corresponding to the download request to obtain an analyzing result; and a judging unit configured to judge whether the physical address is granted the download permission corresponding to the download request according to the analyzing result.

11. The device of claim 10 further comprising a second judging module and a registering module;

the second judging module is configured to judge whether basic information of the television and the physical address are registered in the server terminal;

if the basic information and the physical address are registered in the server terminal, the analyzing unit analyzes the determining result sent from the server terminal that determines whether the physical address is granted the download permission corresponding to the download request to obtain an analyzing result;

if the basic information and the physical address are not registered in the server terminal, the registering module registers the basic information and the physical address in the server terminal, and controls the server terminal to grant the download permission to the physical address, and thereafter the analyzing unit analyzes the determining result sent from the server terminal that determines whether the physical address is granted the download permission corresponding to the download request to obtain an analyzing result.

12. The device of claim 9, wherein the first judging module comprises:

a sending unit configured to send the obtained physical address to the server terminal;

an analyzing unit configured to analyze a determining result sent from the server terminal that determines whether the physical address is granted the download permission corresponding to the download request to obtain an analyzing result; and a judging unit configured to judge whether the physical address is granted the download permission according to the analyzing result.

13. The device of claim 12 further comprising a second judging module and a registering module;

the second judging module is configured to judge whether the basic information and the physical address are registered in the server terminal;

if the basic information and the physical address are registered in the server terminal, the analyzing unit analyzes the determining result sent from the server terminal that determines whether the physical address is granted the download permission corresponding to the download request to obtain an analyzing result;

if the basic information and the physical address are not registered in the server terminal, the registering module registers the basic information and the physical address in the server terminal, and controls the server terminal to grant the download permission to the physical address, and thereafter the analyzing unit analyzes the determining result sent from the server terminal that determines whether the physical address is granted the download permission corresponding to the download request to obtain an analyzing result.

14. The device of claim 9, wherein the obtaining module comprises:

an outputting unit configured to send the download request to a C language plug-in interface when receiving the download request inputted from a user through the browser, and to send the download request to the Android browser through a Java communication interface; and an obtaining units configured to obtain the physical address and the basic information when the Android browser receives the download request.

15. The device of claim 14, wherein the first judging module comprises:

a sending unit configured to send the obtained physical address to the server terminal;

an analyzing unit configured to analyze a determining result sent from the server terminal that determines whether the physical address is granted the download permission corresponding to the download request to obtain an analyzing result;

a judging unit configured to judge whether the physical address is granted the download permission corresponding to the download request according to the analyzing result.

16. The device of claim 15 further comprising a second judging module and a registering module;

the second judging module is configured to judge whether the basic information and the physical address are registered in the server terminal;

if the basic information and the physical address are registered in the server terminal, the analyzing unit analyzes the determining result sent from the server terminal that determines whether the physical address is granted the download permission corresponding to the download request to obtain an analyzing result;

if the basic information and the physical address are not registered in the server terminal, the registering module registers the basic information and the physical address in the server terminal, and controls the server terminal to grant the download permission to the physical address, and thereafter the analyzing unit analyzes the determining result sent from the server terminal that determines whether the physical address is granted the download permission corresponding to the download request to obtain an analyzing result.

* * * * *